United States Patent
Sasagawa

(10) Patent No.: US 7,127,594 B2
(45) Date of Patent: Oct. 24, 2006

(54) MULTIPROCESSOR SYSTEM AND PROGRAM OPTIMIZING METHOD

(75) Inventor: Yukihiro Sasagawa, Kyoto (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 411 days.

(21) Appl. No.: 10/230,199

(22) Filed: Aug. 29, 2002

(65) Prior Publication Data

US 2003/0074542 A1 Apr. 17, 2003

(30) Foreign Application Priority Data

Sep. 3, 2001 (JP) ............................. 2001-265555

(51) Int. Cl.
*G06F 9/44* (2006.01)
*G06F 9/52* (2006.01)

(52) U.S. Cl. ..................... 712/229; 712/31; 712/43

(58) Field of Classification Search .................. 712/31, 712/43, 24, 229, 206; 709/209, 228; 718/106; 713/340

See application file for complete search history.

(56) References Cited

U.S. PATENT DOCUMENTS

| | | | | |
|---|---|---|---|---|
| 4,803,620 | A * | 2/1989 | Inagami et al. | 712/203 |
| 4,926,318 | A * | 5/1990 | Nakayama | 710/107 |
| 5,638,526 | A * | 6/1997 | Nakada | 712/218 |
| 6,112,288 | A * | 8/2000 | Ullner | 712/20 |
| 6,216,220 | B1 | 4/2001 | Hwang | |
| 6,272,616 | B1 * | 8/2001 | Fernando et al. | 712/20 |
| 6,631,439 | B1 * | 10/2003 | Saulsbury et al. | 711/104 |
| 6,687,838 | B1 * | 2/2004 | Orenstien et al. | 713/320 |
| 2001/0042187 | A1 * | 11/2001 | Tremblay | 712/2 |

FOREIGN PATENT DOCUMENTS

| | | |
|---|---|---|
| JP | 5-257687 | 10/1993 |
| JP | 9-274567 | 10/1997 |
| JP | 10-091439 | 4/1998 |
| JP | 2000-029731 A | 1/2000 |
| JP | 2000-47887 | 2/2000 |
| JP | 2001-184208 A | 7/2001 |

OTHER PUBLICATIONS

Shihjong Kuo, "Multi-Threaded Programming for Next Generation Multi-Processing Technology", Intel Developer Forum, Aug. 2001, pp. 1-35.

Debbie Marr, "Introduction to Next Generation Multiprocessing: Hyper-Threading Technology", Intel Corporation homepage, Aug. 8, 2001.

"Introduction to Hyper-Threading Technology", Document 250008-002, pp. 1-4.

* cited by examiner

*Primary Examiner*—Daniel Pan
(74) *Attorney, Agent, or Firm*—McDermott Will & Emery LLP

(57) ABSTRACT

A multiprocessor system capable of responding to various types of processing to improve the processing efficiency of the entire system. Each of a plurality of processors holds information indicating the program control mode, a VLIW mode or a multithread mode, in a program synchronization flag of a program controller. A master processor, responsible for program control of the entire system, notifies an instruction memory section for storing instructions in a program of updated information when the program synchronization flag information is updated.

4 Claims, 17 Drawing Sheets

FIG. 3A VLIW mode
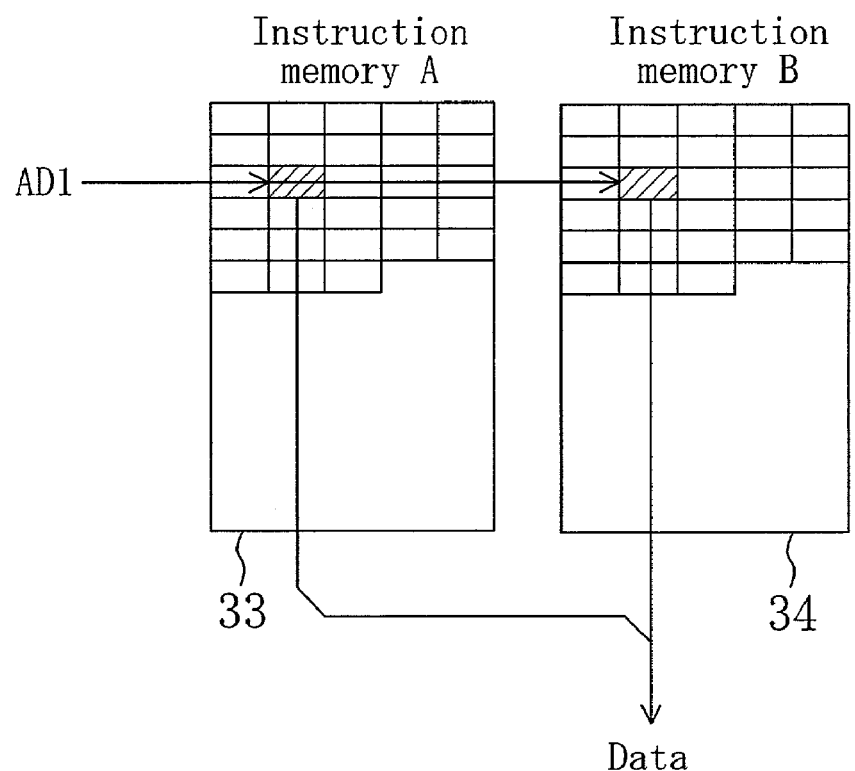
FIG. 3B Multithread mode
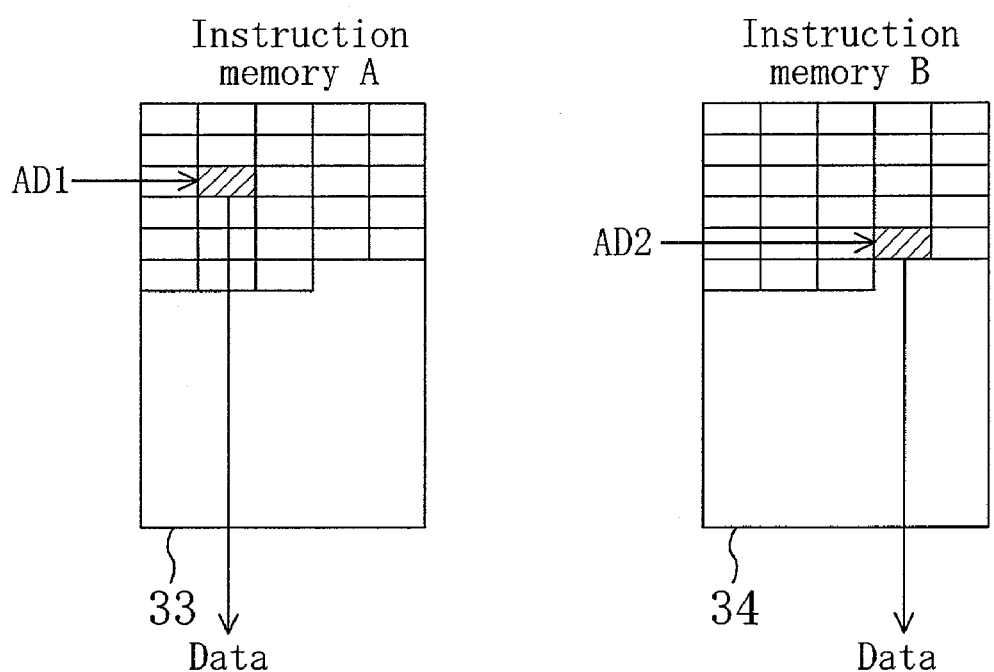

Multithread→VLIW

VLIW→Multithread

FIG. 6A
Program
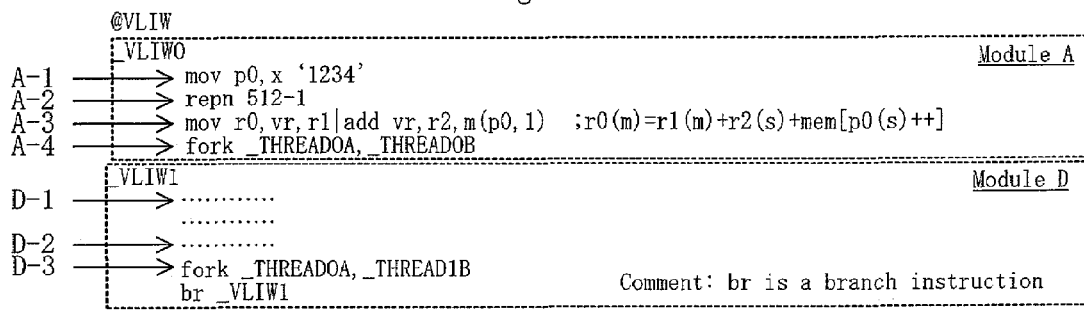
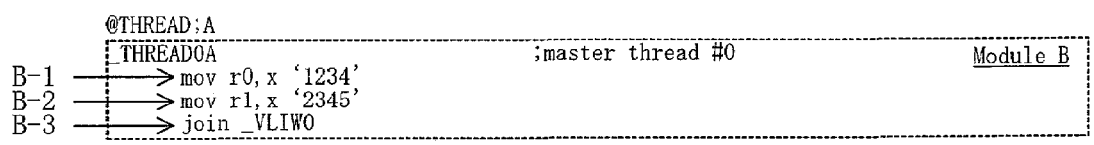
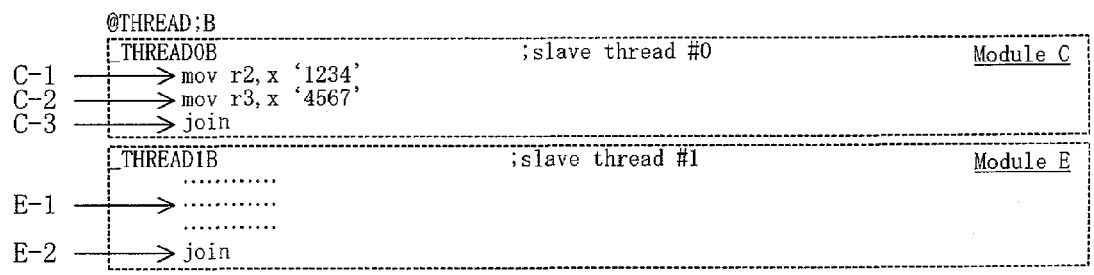
FIG. 6B
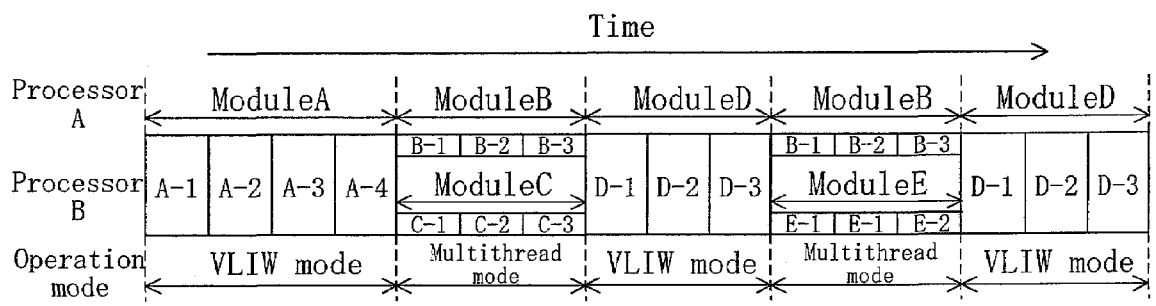

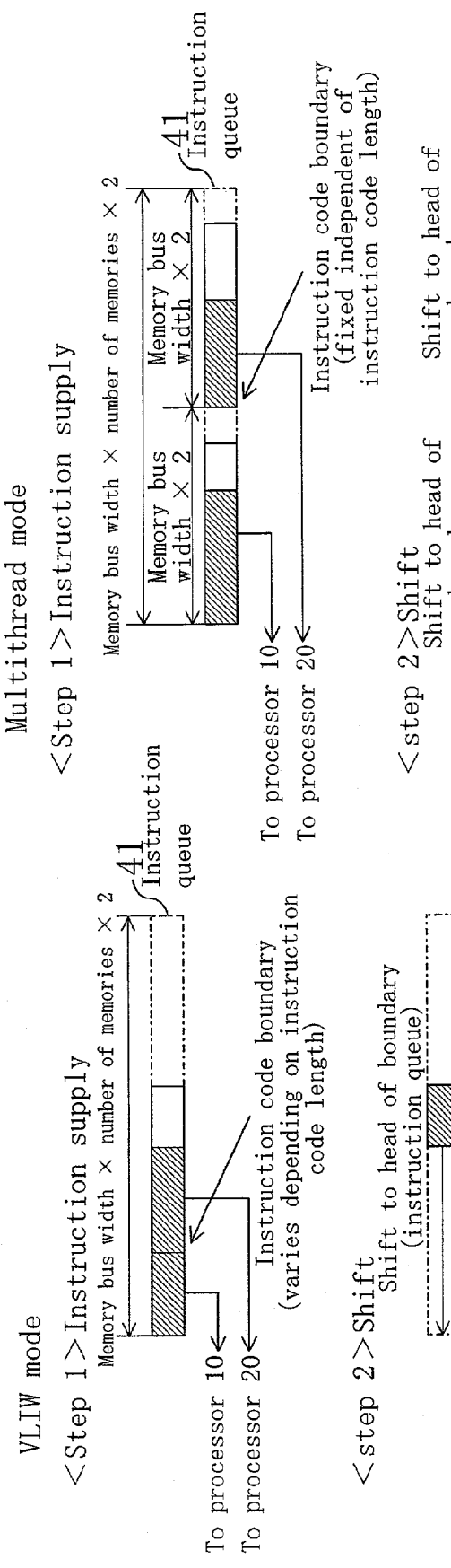
FIG. 7A / FIG. 7B

FIG. 13

Program (compiler output)

@VLIW

```
_VLIW0                                                              Module A
    mov p0,x '1234'
    repn 512-1
    mov r0,vr,r1|add vr,r2,m(p0,1)    ;r0(m)=r1(m)+r2(s)+mem[p0(s)++]
    fork _THREAD0A,_THREAD0B
```

```
_VLIW1                                                              Module D
    ...........
    ...........
    ...........
    fork _THREAD0A,_THREAD1B
    br _VLIW1                         Comment: br is a branch instruction
```

@THREAD;A

```
_THREAD0A                 ;master thread #0                         Module B
    mov r0,x '1234'
    mov r1,x '2345'
    join _VLIW0
```

@THREAD;B

```
_THREAD0B                 ;slave thread #0                          Module C
    mov r2,x '1234'
    mov r3,x '4567'
    join
```

```
_THREAD1B                 ;slave thread #1                          Module E
    ...........
    ...........
    join
```

FIG. 16A
| Instruction type | Processor A power consumption [mW/instruction] | | Processor B power consumption [mW/instruction] | |
|---|---|---|---|---|
| | VLIW | Multithread | VLIW | Multithread |
| add*, * | 0.005 | 0.005 | 0.0005 | 0.001 |
| mov*, * | 0.0002 | 0.0002 | 0.0001 | 0.0002 |
| mac, a0, m(p0, 1) | 0.01 | 0.01 | 0.05 | 0.1 |
FIG. 16B
Module A
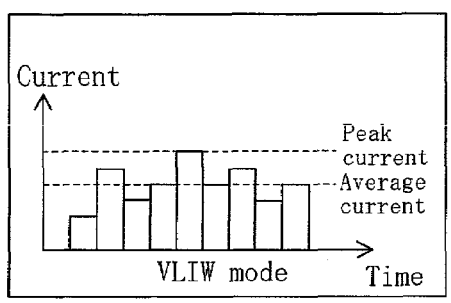 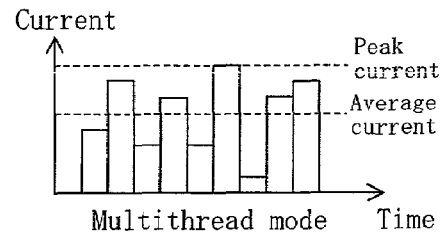
Module B
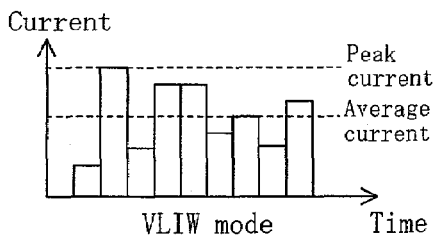 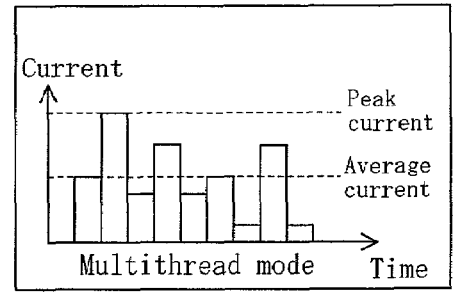
Module C
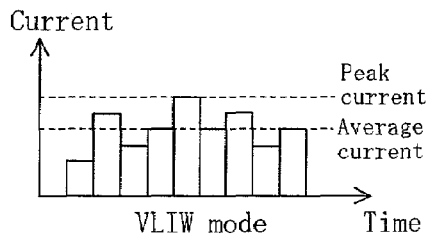 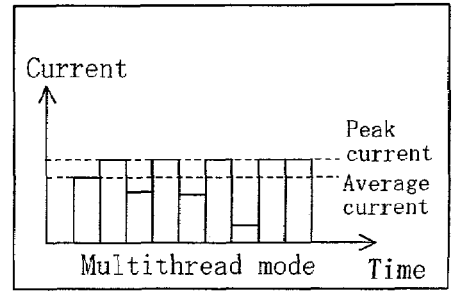

MULTIPROCESSOR SYSTEM AND PROGRAM OPTIMIZING METHOD

BACKGROUND OF THE INVENTION

The present invention relates to a technology on program control in multiprocessor systems.

FIG. 17 shows examples of conventional configurations of processor systems realizing parallel operation of a plurality of arithmetic units and registers. In a multiprocessor system shown in FIG. 17(a) threads (processing units) in processors 110 and 120 are operated independently, in general. This system is therefore considered to exhibit high throughput for applications executing a plurality of independent threads in parallel.

In a very long instruction word (VLIW) system shown in FIG. 17(b), a single instruction code includes description of fields for controlling a plurality of arithmetic units and registers. This system is therefore considered to exhibit high throughput for a single thread.

Superiority of one of the processor systems described above over the other differs depending on the application. Therefore, the processor system to be adopted should preferably be determined according to the features of threads in the application.

Problem to be Solved

In recent embedded systems, various types of processing exist in a mixed state, and therefore it is difficult to determine what processor system should be adopted. For example, there is a case of including both processing of a single thread, which requires very high throughput to realize high-speed real-time processing, and parallel processing of a plurality of threads, which does not require so high throughput. In this case, whatever processor system is adopted, it will never be optimum. In most cases, therefore, a margin is provided for the throughput of any processor system adopted, and this poses a big barrier to attainment of lower power consumption and higher speed of the system.

SUMMARY OF THE INVENTION

An object of the present invention is providing a multiprocessor system capable of responding to various types of processing to improve the processing efficiency of the entire system.

To state specifically, the present invention is directed to the multiprocessor system including: a plurality of processors; and an instruction storage section for storing instructions in a program, wherein the system has a first program control mode for operating the plurality of processors under a single program control and a second program control mode for operating the plurality of processors under a plurality of independent program controls, each of the plurality of processors includes a program controller having a program synchronization flag, the program synchronization flag holding program synchronization information indicating either the first or second program control mode, and one of the plurality of processors serving as a master processor performs program control over the entire multiprocessor system and notifies the instruction storage section of updated program synchronization information when the program synchronization information is updated.

According to the invention described above, the multiprocessor system having a plurality of processors can execute a program stored in the instruction storage section while appropriately switching the program control mode between the first program control mode for operating the plurality of processors under a single program control and the second program control mode for operating the plurality of processors under a plurality of independent program controls. This makes it possible to improve the processing efficiency of the entire system and also effectively use the resources of the processors. Thus, both low power consumption and high-speed processing can be attained In the multiprocessor system of the invention described above, preferably, the first program control mode is a VLIW mode, and the second program control mode is a multithread mode.

Preferably, the instruction storage section has instruction memories of the same number as that of the plurality of processors. When the program synchronization information from the master processor indicates the first program control mode, the instruction memories are operated as a single memory bank, and an instruction address output from the master processor is sent to the instruction memories and a single item of instruction data is output. When the program synchronization information indicates the second program control mode, the instruction memories are operated as a plurality of individual memory banks, and instruction addresses output from the processors are sent to the corresponding instruction memories and a plurality of items of instruction data are output.

Preferably, the multiprocessor system of the invention described above further includes an instruction supply section having an instruction queue for temporarily storing the instruction data output from the instruction storage section in the instruction queue and then supplying the instruction data to the plurality of processors, wherein the instruction supply section receives notification of the program synchronization information from the master processor, and when the program synchronization information indicates the first program control mode, the instruction queue is used as a queue for a single item of instruction data, while when the program synchronization information indicates the second program control mode, the instruction queue is used as a queue for a plurality of items of instruction data.

In the multiprocessor system of the invention described above, preferably, the master processor updates the program synchronization information to indicate the second program control mode when the master processor receives a first branch instruction code having a plurality of items of address data, and each of the plurality of processors updates the program synchronization information to indicate the first program control mode when the processor receives a second branch instruction code having one item of address data, and notifies the other processors of the updated program synchronization information.

Alternatively, the present invention is directed to a multiprocessor system including: first and second processors; and information conveying means for conveying an output of an internal component of the second processor to the first processor, wherein when the first processor receives an instruction code having an operand designating an internal component of the second processor, the first processor executes processing according to the instruction code using an output of the internal component of the second processor via the information conveying means.

According to the invention described above, processing is performed by combining components or the plurality of processors, and this improves the arithmetic operation power.

Alternatively, the present invention is directed to a multiprocessor system including a plurality of processors, wherein at least one of the plurality of processors includes an instruction trigger generator having an instruction register for storing an instruction code, the instruction trigger generator comparing an instruction code input into the processor with the instruction code stored in the instruction register to detect whether or not the instruction codes match with each other, the processor stores an instruction code to be triggered in the instruction register when the processor receives a trigger setting instruction, and the processor sends a trigger signal to the other processors when the instruction trigger generator detects matching of the instruction codes.

According to the invention described above, processing is performed in combination with the processing status of other processors, and this improves the program control power.

Alternatively, the present invention is directed to a method for optimizing a program to be rendered executable in a multiprocessor system. The multiprocessor system includes a plurality of processors and has a first program control mode for operating the plurality of processors under a single program control and a second program control mode for operating the plurality of processors under a plurality of independent program controls. The method includes the first to third steps of: detecting the dependence of each module in the program with the other modules; detecting the throughput of each module in the program; and deciding in which mode each module should be executed, the first program control mode or the second program control mode, based on the detected dependence and throughput.

Preferably, the program optimizing method of the invention described above further includes the step of allocating an instruction memory address space composed of instruction memories of the multiprocessor system to instruction codes of the modules based on the results of the decision in the third step.

Alternatively, the present invention is directed to a method for optimizing a program to be rendered executable in a multiprocessor system. The multiprocessor system includes a plurality of processors, and has a first program control mode for operating the plurality of processors under a single program control and a second program control mode for operating the plurality of processors under a plurality of independent program controls. The method includes the first and second steps of: determining the peak power and average power of each module using a consumption power table showing power consumption for each instruction type for each processor; and deciding in which mode each module should be executed, the first program control mode or the second program control mode, by referring to the determined peak power and average power of each module.

BRIEF DESCRIPTION OF THE DRAWINGS

FIG. 3 conceptually illustrates memory access operations for program control modes.

FIG. 6 conceptually illustrates an example of operation of the multiprocessor system of the first embodiment of the present invention.

FIG. 7 illustrates operation of an instruction queue provided in an instruction supply section.

FIG. 13 is an example of a program in which the program control mode has been decided for each module.

FIG. 16(a) shows an example of a power consumption table, and FIG. 16(b) shows views for demonstrating decision of the program control mode with reference to power consumption.

DESCRIPTION OF THE PREFERRED EMBODIMENTS

Hereinafter, embodiments of the present invention will be described with reference to the accompanying drawings.

(First Embodiment)

Figure 1:
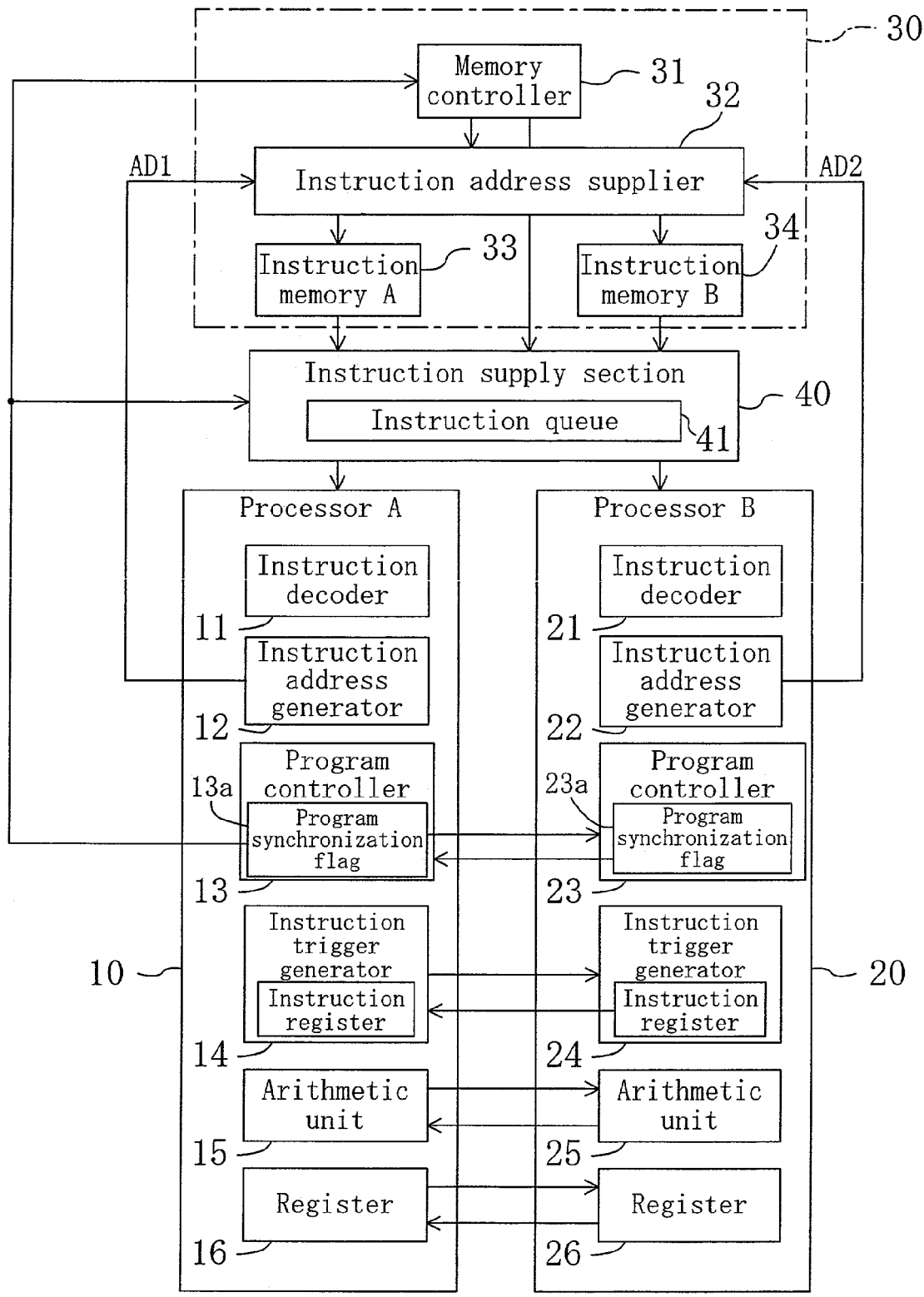
FIG. 1 is a conceptual block diagram of a multiprocessor system of the first embodiment of the present invention.

FIG. 1 is a conceptual block diagram of a multiprocessor system of the first embodiment of the present invention. Referring to FIG. 1, a plurality of processors 10 and 20 (processors A and B), an instruction storage section 30 and an instruction supply section 40 are connected with one another. Each of the processors 10 and 20 includes an instruction decoder 11, 21, an instruction address generator 12, 22, a program controller 13, 23, an instruction trigger generator 14, 24, an arithmetic unit 15, 25 and a register 16, 26. The instruction storage section 30 includes a memory controller 31, an instruction address supplier 32 and a plurality of instruction memories 33 and 34 (instruction memories A and B).

The multiprocessor system of FIG. 1 has a first program control mode, in which the plurality of processors 10 and 20 are operated under a single program control by a single processor, and a second program control mode, in which the plurality of processors 10 and 20 are operated under a plurality of independent program controls. In this embodiment, a VLIW mode is used as the first program control mode, and a multithread mode is used as the second program control mode.

In each of the processors 10 and 20, the program controller 13, 23 has a program synchronization flag 13a, 23a, which holds program synchronization information indicating whether the control mode is the VLIW mode or the multithread mode. The processor 10 serves as the master processor taking on both program control of the entire multiprocessor system and execution of instructions when the system is in the VLIW mode, while the processor 20 serves as a slave processor focusing on execution of instructions. The processor 10 as the master processor notifies the instruction storage section 30 and the instruction supply section 40 of updated program synchronization information when the program synchronization information is updated.

In the instruction memory 33, 34, instructions in a program to be processed by the multiprocessor system are stored. The instruction address generator 12 of the processor 10 outputs a first instruction address AD1, and the instruction address generator 22 of the processor 20 outputs a second instruction address AD2. The instruction address supplier 32 of the instruction storage section 30 receives the first and second instruction addresses AD1 and AD2, and supplies the instruction addresses to the instruction memories 33 and 34 so that corresponding instructions in the program are read from the instruction memories 33 and 34.

Figure 2:
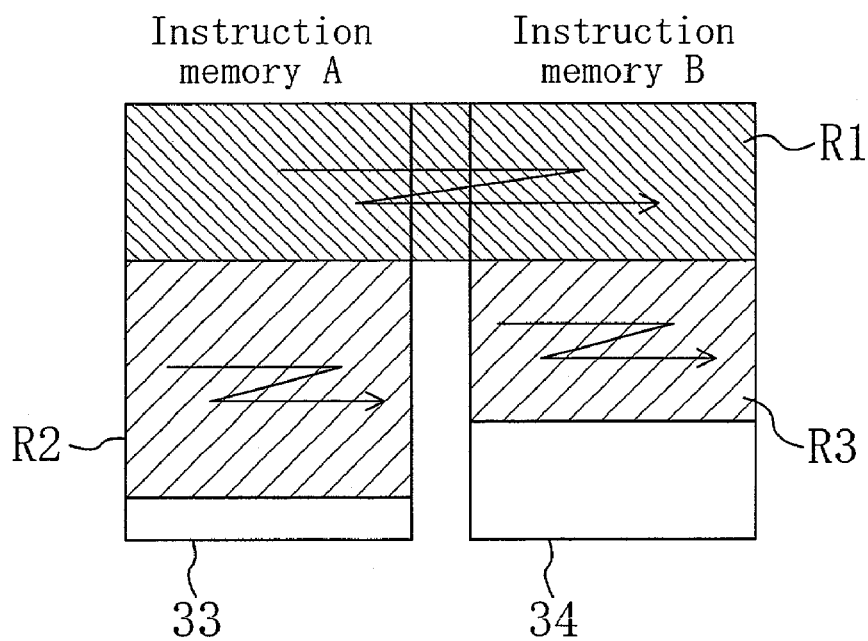
FIG. 2 is a conceptual view of an instruction memory address space composed of a plurality of instruction memories.

FIG. 2 is a conceptual view of an instruction memory address space composed of the plurality of instruction memories 33 and 34. As shown in FIG. 2, as a VLIW region R1 for the VLIW mode, a single instruction memory address space is made up from the plurality of instruction memories 33 and 34. However, as multithread regions R2 and R3 for the multithread mode, the instruction memories 33 and 34 make up respective independent instruction memory address spaces.

FIG. 3 conceptually illustrates memory access operations for the respective program, control modes. In the VLIW mode, as shown in FIG. 3(*a*), a common address (the first instruction address AD1 output from the processor 10 as the master processor) is supplied to the instruction memories 33 and 34. Data output from the instruction memories 33 and 34 are combined to be output as a single item of instruction data. In other words, in the VLIW mode, the instruction memories 33 and 34 operate as a logical bank having a data length corresponding to the number of memories.

In the multithread mode, as shown in FIG. 3(*b*), while the first instruction address AD1 is supplied to the instruction memory 33, the second instruction address AD2 is supplied to the instruction memory 34. Data output from the instruction memories 33 and 34 are output as they are as separate items of instruction data. In other words, in the multithread mode, the instruction memories 33 and 34 operate as separate logical banks outputting data independently.

The instruction address supplier 32 switches the memory access operation as shown in FIG. 3 according to a direction from the memory controller 31. The processor 10 as the master processor notifies the memory controller 31 of the instruction storage section 30 of updated program synchronization information when the program synchronization information held by the program synchronization flag 13 is updated. On receipt of this notification, the memory controller 31 detects switching of the program control mode and directs the instruction address supplier 32 to switch the memory access operation.

Figure 4B:
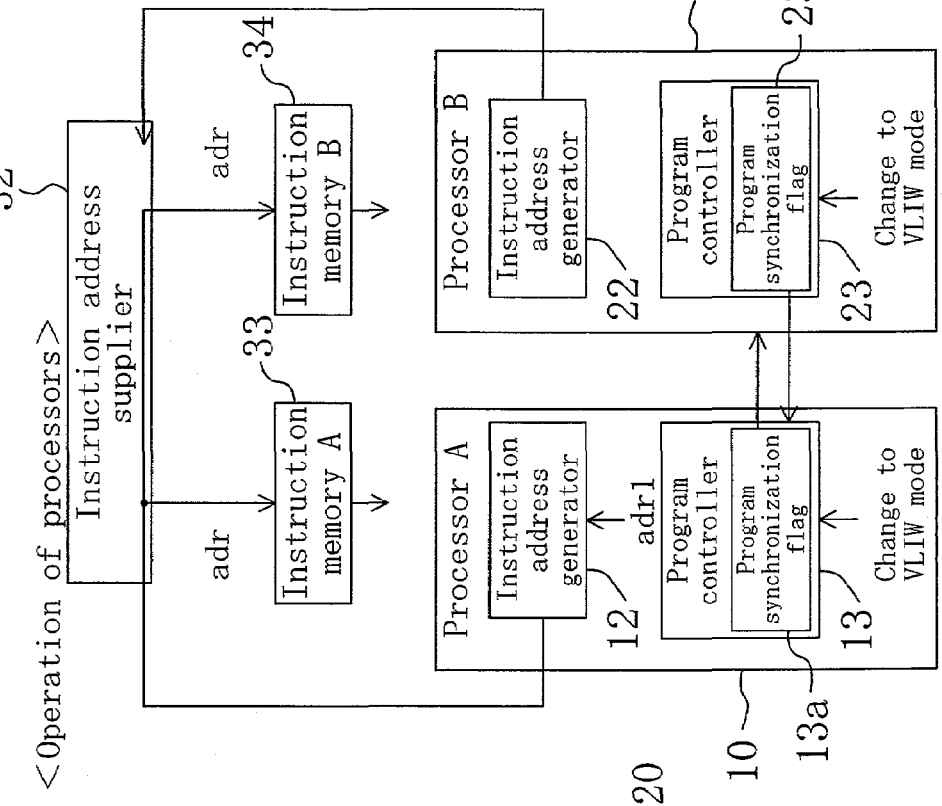
FIG. 4 illustrates switching between the program control modes using instruction codes.
Figure 4A:
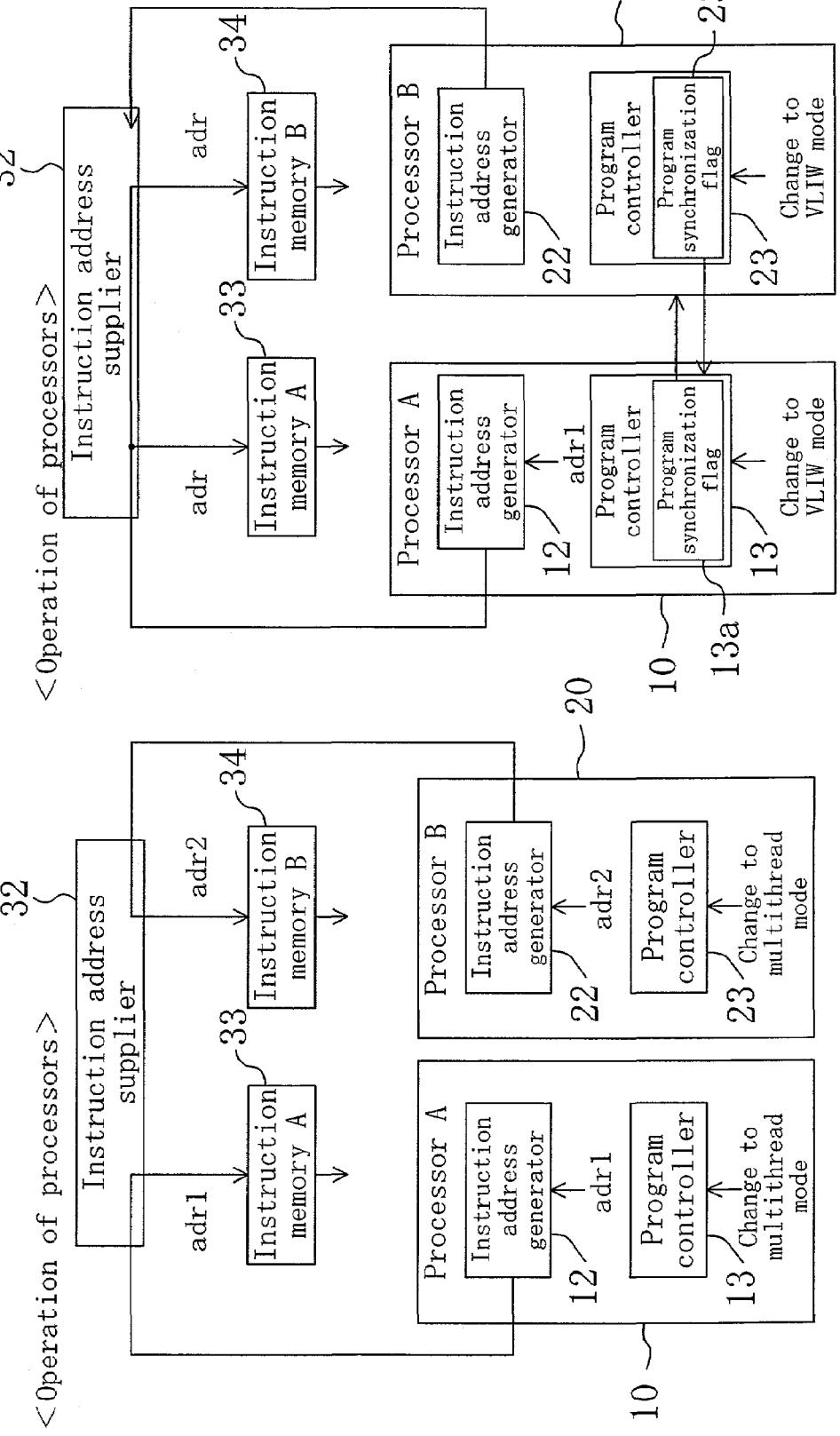

In this embodiment, the program control mode is switched by issuing a predetermined instruction code. FIG. 4 illustrates switching of the program control mode using an instruction code in this embodiment, in which (a) shows the switching from the VLIW mode to the multithread mode and (b) shows the switching from the multithread mode to the VLIW mode. As shown in FIG. 4, the multiprocessor system of this embodiment prepares "fork" instruction as an instruction for changing the mode from the VLIW mode to the multithread mode and "join" instruction as an instruction for changing the mode from the multithread mode to the VLIW mode. The "fork" instruction as a first branch instruction code includes a plurality items of address data adr1 and adr2 as instruction operands with which the processors 10 and 20 can designate the addresses of branching destinations. The "join" instruction as a second branch instruction code includes one item of address data adr as an instruction operand with which the processor 10 as the master processor can designate the address of a branching destination.

Referring to FIG. 4(*a*), if "fork" instruction is issued when the multiprocessor system of this embodiment is in the VLIW mode, the addresses adr1 and adr2 designated in the instruction are set in the respective instruction address generators 12 and 22. With this setting, the program controllers 13 and 23 change the program control mode to the multithread mode. The instruction address supplier 32 supplies the addresses adr1 and adr2 received from the instruction address generators 12 and 22 to the corresponding instruction memories 33 and 34.

Referring to FIG. 4(*b*), if the "join" instruction is issued when the multiprocessor system of this embodiment is in the multithread mode, the address adr designated in this instruction is set in the instruction address generator 12 of the processor 10 as the master processor. With this setting, the program controller 13 changes the program control mode to the VLIW mode. To state specifically, the program controller 13 updates the program synchronization information held by the program synchronization flag 13*a* so as to indicate the VLIW mode, and notifies the other processor 20 of this update. The instruction address supplier 32 supplies the address adr received from the instruction address generator 12 to the instruction memories 33 and 34.

By the operation described above, the change from the VLIW mode to the multithread mode or from the multithread mode to the VLIW mode is realized.

In this embodiment, control synchronization between the processors during the change of the program control mode is established by use of the program synchronization flags 13*a* and 23*a* possessed by the program controllers 13 and 23 of the processors 10 and 20. Alternatively, control synchronization may be established by use of flags associated with the synchronization flags 13*a* and 23*a*.

Figure 5A:
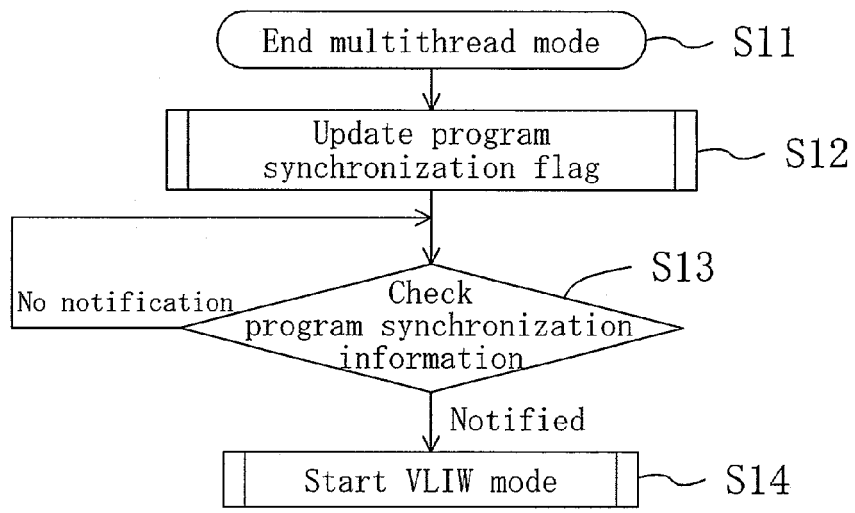
FIG. 5(a) is a flowchart showing a processor control procedure related to a program synchronization flag.
Figure 5B:
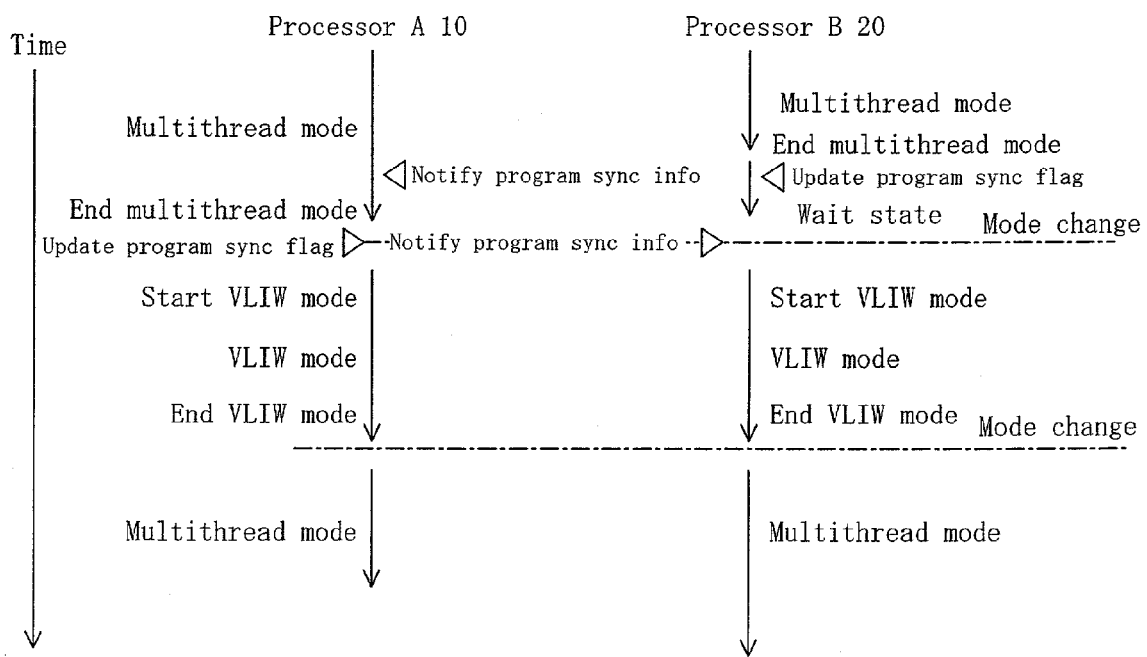
FIG. 5(b) is a flowchart showing synchronizing operation between processors.

FIG. 5(*a*) is a flowchart showing a processor control procedure related to the program synchronization flag. As shown in FIG. 5(*a*), upon termination of the multithread mode (S11), each of the processors 10 and 20 first updates the program synchronization flag (S12). With this updating, the other processor is notified of the program synchronization information. Each processor then checks whether or not it has been notified of program synchronization information by the other processor (S13). Once the processor confirms notification of program synchronization information from the other processor, it starts operation in the VLIW mode (S14).

FIG. 5(*b*) is a timing chart showing synchronized operation between the processors according to the processor control procedure shown in FIG. 5(*a*). As shown in FIG. 5(*b*), assume that the processors 10 and 20 operate in the multithread mode and then the processor 20 terminates the multithread mode first. The processor 20 updates the program synchronization flag and notifies the processor 10 of the program synchronization information. The processor 20 is then put in the wait state until it is notified of program synchronization information by the processor 10.

The processor 10 then terminates the multithread mode and updates the program synchronization flag. Since having already been notified of the program synchronization information by the processor 20, the processor 10 changes the mode to the VLIW mode. Having been notified of the program synchronization information by the processor 10, the processor 20 also changes the mode to the VLIW mode.

From then on, the processors 10 and 20 operate in the VLIW mode. In this way, control synchronization during the change of the program control mode is established.

FIG. 6 conceptually illustrates an example of operation of the multiprocessor system of this embodiment. Once a program as shown in FIG. 6(a) is given, it is executed with the program control mode being switched as shown in FIG. 6(b). For example, module A is executed in the VLIW mode, and modules B and C are executed in the multithread mode by the processor A 10 and the processor B 20, respectively.

Hereinafter, supply of instructions in the VLIW mode and the multithread mode will be discussed. The instruction supply section includes an instruction queue 41 as shown in FIG. 1. The instruction queue 41 is used to enable supply of the entire instruction data to a processor by one unit of instruction fetch even when the instruction code length is variable.

FIG. 7 illustrates operation of the instruction queue 41, in which (a) shows the operation in the VLIW mode and (b) shows the operation in the multithread mode. The operation of the instruction queue 41 is roughly divided into four process steps: step 1 of supplying instructions to the plurality of processors; step 2 of shifting remaining instruction data; step 3 of fetching new instruction data; and step 4 of merging instruction data.

The instruction queuing operation in the VLIW mode is different from that in the multithread mode in respects of the instruction code boundary and the way of storing instructions.

In the VLIW mode, as shown in FIG. 7(a), the instruction code boundary varies depending on the length of the instruction codes supplied to the processors. After supply of instruction data to the processors 10 and 20 in step 1, the remaining instruction data is shifted to the boundary head in step 2. In the VLIW mode, only one boundary head exists, which is the same as the head of the instruction queue 41. Data is fetched from the plurality of memories 33 and 34 in step 3, and the fetched data is merged with the remaining instruction data in step 4.

In the multithread mode, as shown in FIG. 7(b), the instruction code boundary is fixed, independent of the length of the instruction codes supplied to the processors 10 and 20, at the position corresponding to the length double the instruction memory bus width. After supply of instruction data to the processors 10 and 20 in step 1, the remaining instruction data is shifted to the boundary heads in step 2. In the multithread mode, a plurality of boundary heads exist. Therefore, the remaining instruction data is put in different locations in the instruction queue 41. Data is fetched from the plurality of memories 33 and 34 in step 3, and the fetched data is merged with the remaining instruction data in step 4. By the operation of the instruction queue 41 described above, the variable length instruction operation is realized in both the VLIW mode and the multithread mode.

Figure 8:
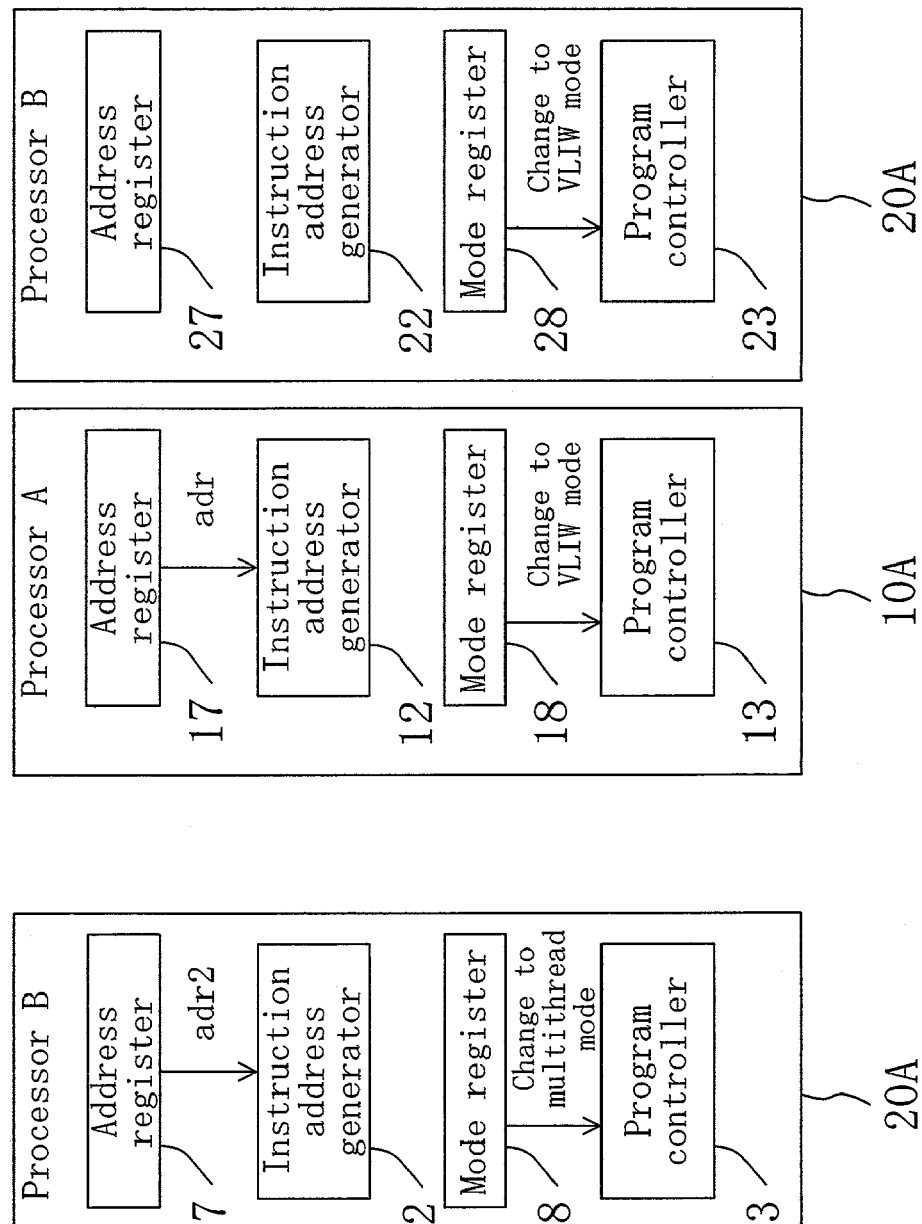
FIG. 8 shows a configuration enabling switching of the program control modes by use of registers.

The program control mode may be switched in a way other than using instruction codes described above. FIG. 8 shows an example of a configuration enabling switching of the program control mode by use of registers provided in processors. In the example shown in FIG. 8, each of processors 10A and 20A includes an address register 17, 27 for holding a branching destination address during mode change and a mode register 18, 28 for holding information on the program control mode.

(Second Embodiment)

Figure 9:
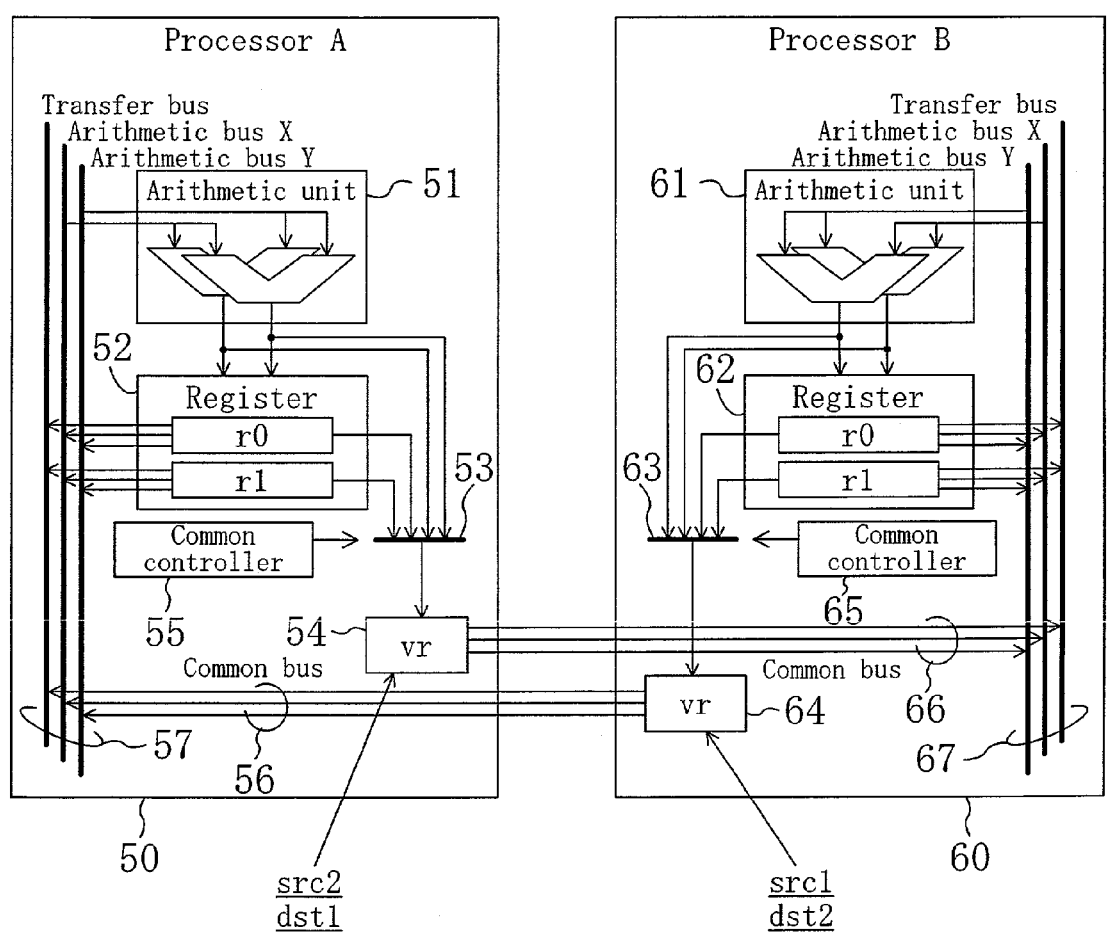
FIG. 9 is a view of a configuration of the main part of a multiprocessor system of the second embodiment of the present invention.

FIG. 9 is a view of a configuration of the main part of a multiprocessor system of the second embodiment of the present invention. Referring to FIG. 9, each of a processor 50 as the first processor and a processor 60 as the second processor includes an arithmetic unit 51, 61, a register 52, 62, a selector 53, 63, a common register (vr) 54, 64, a common controller 55, 65, a common bus 56, 66 and a transfer/arithmetic bus 57, 67. The common register 54 as an internal component of the processor 50 is connected to the transfer/arithmetic bus 67 of the processor 60 via the common bus 66 as an information conveying means. The common register 64 as an internal component of the processor 60 is connected to the transfer/arithmetic bus 57 of the processor 50 via the common bus 56 as an information conveying means.

In the processor 50, the selector 53 selects one from the outputs of the arithmetic unit 51 and the register 52, and the selected one is input into the common register 54. The selector 53 determines which element of the arithmetic unit 51 or the register 52 should be selected under control of the common controller 55. In the processor 60, the selector 63 selects one from the outputs of the arithmetic unit 61 and the register 62, and the selected one is input into the common register 64. The selector 63 determines which element of the arithmetic unit 61 or the register 62 should be selected from the outputs of under control of the common controller 65.

Assume that the following instruction description is given to the multiprocessor system of FIG. 9.

Opecode1 dst1, src1 | opecode2 dst2, src2

Wherein "opecode1" is an instruction for the processor 50, "opecode2" is an instruction for the processor 60, "dst1" is a transfer destination for the processor 50, "dst2" is a transfer destination for the processor 60, "src1" is a transfer source for the processor 50, and "src2" is a transfer source for the processor 60.

In the above instruction description, the following correspondences are established.

When dst1=vr, the common register 54 of the processor 50 is the transfer destination.

When src1=vr, the common register 64 of the processor 60 is the transfer source.

When dst2=vr, the common register 64 of the processor 60 is the transfer destination.

When src2=vr, the common register 54 of the processor 50 is the transfer source.

That is to say, when the processor 50 receives an instruction code having an operand designating the common register 64 of the processor 60, the processor 50 executes processing according to this instruction code using the output of the common register 64 of the processor 60 received via the common bus 56. Likewise, when the processor 60 receives an instruction code having an operand designating the common register 54 of the processor 50, the processor 60 executes processing according to this instruction code using the output of the common register 54 of the processor 50 received via the common bus 66.

By the operation described above, the degree of freedom of arithmetic operation attainable by one processing step increases, and this enhances the throughput. Taking an example of arithmetic expressions, Y=A+B and B=C×D may be combined into Y=A+(C×D). This can be realized by presuming B=vr.

In the configuration shown in FIG. 9, the processors 50 and 60 are provided with the common registers 54 and 64. Alternatively, the selectors 53 and 53 may be directly connected to the common buses with no common registers provided. In this case, as an operand of an instruction code, the arithmetic unit or the register of the counterpart processor may be directly designated.

As the common buses 56 and 66, those capable of exchange of signals may be used. On this account, other information conveying means such as dedicated signal lines may be used.

(Third Embodiment)

Figure 10:
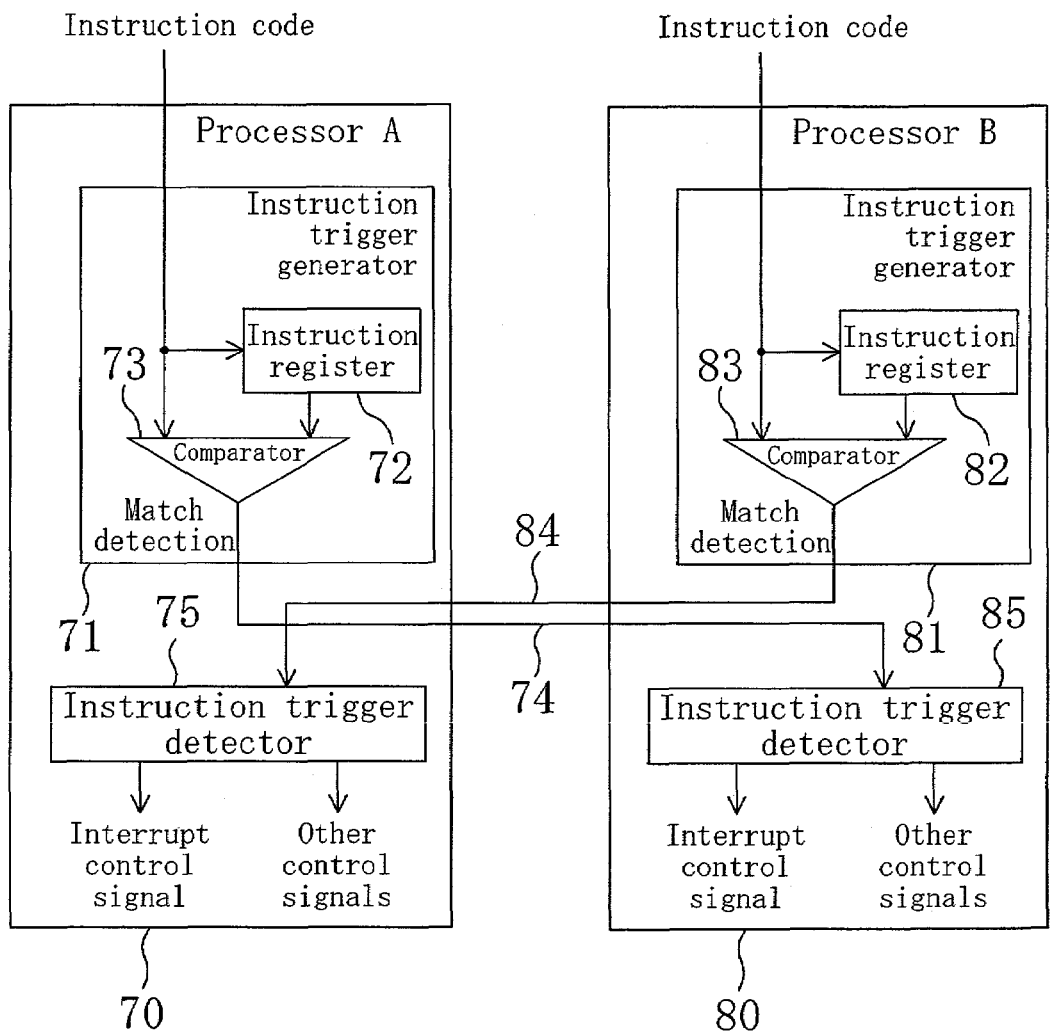
FIG. 10(a) is a view of a configuration of the main part of a multiprocessor system of the third embodiment of the present invention.
FIG. 10(b) shows an example of instruction description for the system of FIG. 10(a).

FIG. 10(a) is a view of a configuration of the main part of a multiprocessor system of the third embodiment of the present invention. Referring to FIG. 10(a), a processor 70 includes an instruction trigger generator 71 having an instruction register 72 and a comparator 73, and an instruction trigger detector 75. Likewise, a processor 80 includes an instruction trigger generator 81 having an instruction register 82 and a comparator 83, and an instruction trigger detector 85. A first trigger communication bus 74 extends between the instruction trigger generator 71 of the processor 70 and the instruction trigger detector 85 of the processor 80, and a second trigger communication bus 84 extends between the instruction trigger generator 81 of the processor 80 and the instruction trigger detector 75 of the processor 70.

In the processor 70, the instruction trigger generator 71 compares an instruction code input into the processor 70 with an instruction code stored in the instruction register 72 by means of the comparator 73 to detect whether or not these instruction codes match with each other, and outputs a trigger signal if matching is detected. The trigger signal output from the instruction trigger generator 71 is received by the instruction trigger detector 85 of the processor 80 via the first trigger communication bus 74. On receipt of the trigger signal, the instruction trigger detector 85 outputs an interrupt control signal to generate an interrupt in the processor 80.

Likewise, in the processor 80, the instruction trigger generator 81 compares an instruction code input into the processor 80 with an instruction code stored in the instruction register 82 by means of the comparator 83 to detect whether or not these instruction codes match with each other, and outputs a trigger signal if matching is detected. The trigger signal output from the instruction trigger generator 81 is received by the instruction trigger detector 75 of the processor 70 via the second trigger communication bus 84. On receipt of the trigger signal, the instruction trigger detector 75 outputs an interrupt control signal to generate an interrupt in the processor 70.

FIG. 10(b) shows an example of instruction description for the multiprocessor system of FIG. 10(a). Assume that both the processors 70 and 80 operate independently in the multithread mode and that the processor 70 executes the assembler source shown in FIG. 10(b).

The description "trig" is an instruction of setting an instruction coming next as a trigger. The instruction set as a trigger is registered in the instruction register 72. The description "untrig" is an instruction of releasing the trigger setting. In FIG. 10(b), therefore, with the description "trig", the next-coming instruction "add r0, r1" is registered in the instruction register 72 and set as a trigger. The processor 70 continues execution of the assembler sequentially, and once the instruction "add r0, r1" is executed, the trigger signal is output from the instruction trigger generator 71, to be received by the instruction trigger detector 85 of the processor 80 via the first trigger communication bus 74. This causes generation of an interrupt in the processor 80. Thereafter, at a stage at which the trigger is no more necessary, the processor 70 cancels the trigger setting with the description "untrig". In this embodiment, with this series of operation, synchronization suitable for the details of the program executed can be attained.

In general, exchange of trigger information between processors as described above is implemented by communications via a memory or a register. In this case, to send trigger information, the trigger information must be written in the memory or the register within the program. In this embodiment, however, since an instruction itself executed in the program can be trigger information, no write is necessary and this improves the operation efficiency for attaining synchronization.

(Fourth Embodiment)

The fourth embodiment of the present invention relates to a method for optimizing a program to be rendered executable by a multiprocessor system such as that shown in the first embodiment.

Figure 11:
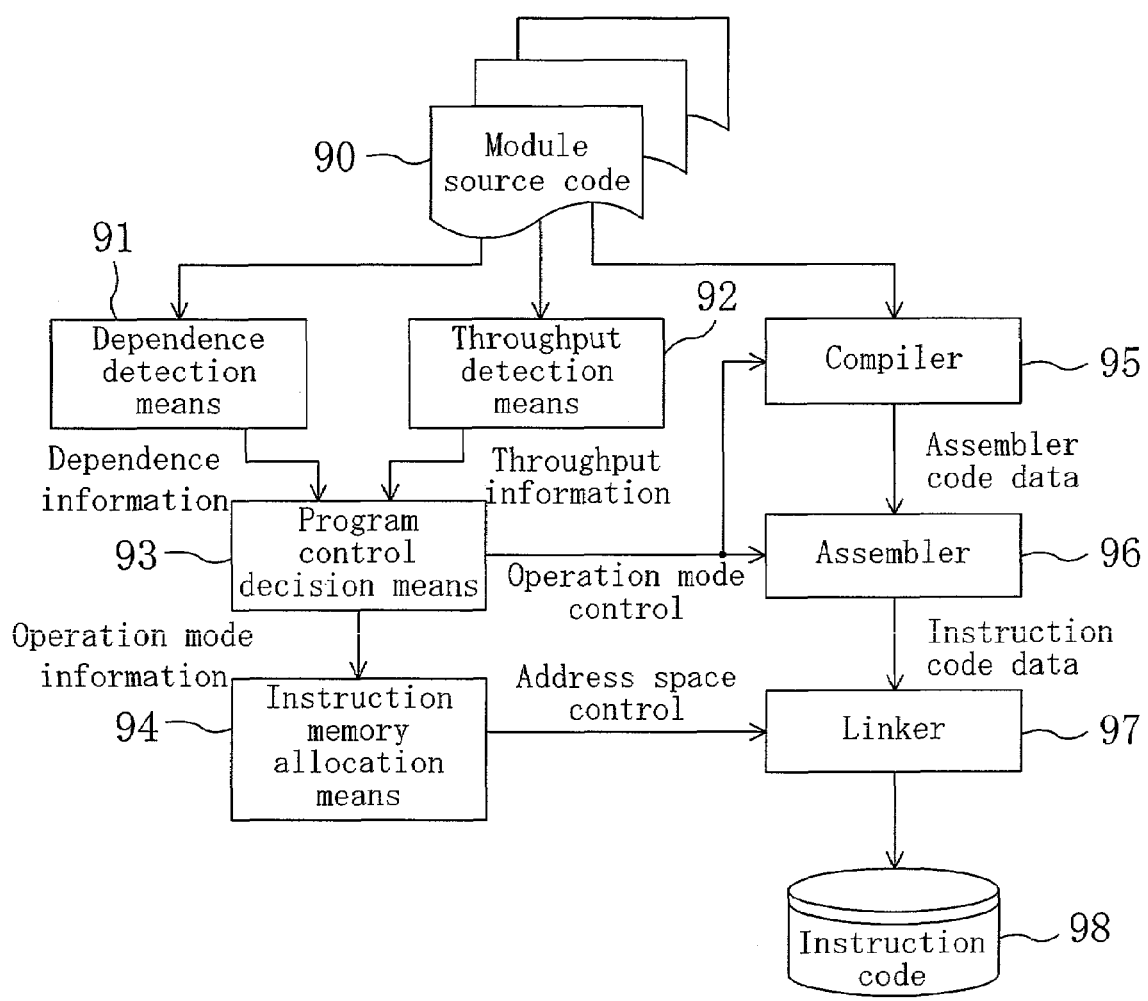
FIG. 11 is a conceptual block diagram of a program optimizing apparatus of the fourth embodiment of the present invention.

FIG. 11 is a conceptual block diagram of a program optimizing apparatus of the fourth embodiment of the present invention. Referring to FIG. 11, a source code 90 of each module constituting an application is input into a dependence detection means 91, a throughput detection means 92 and a compiler 95. The dependence detection means 91 analyzes the module source code 90 to detect a dependence of the module in question with the other modules of the program. The throughput detection means 92 analyzes the module source code 90 to detect the throughput of each module of the program.

Figure 12A:
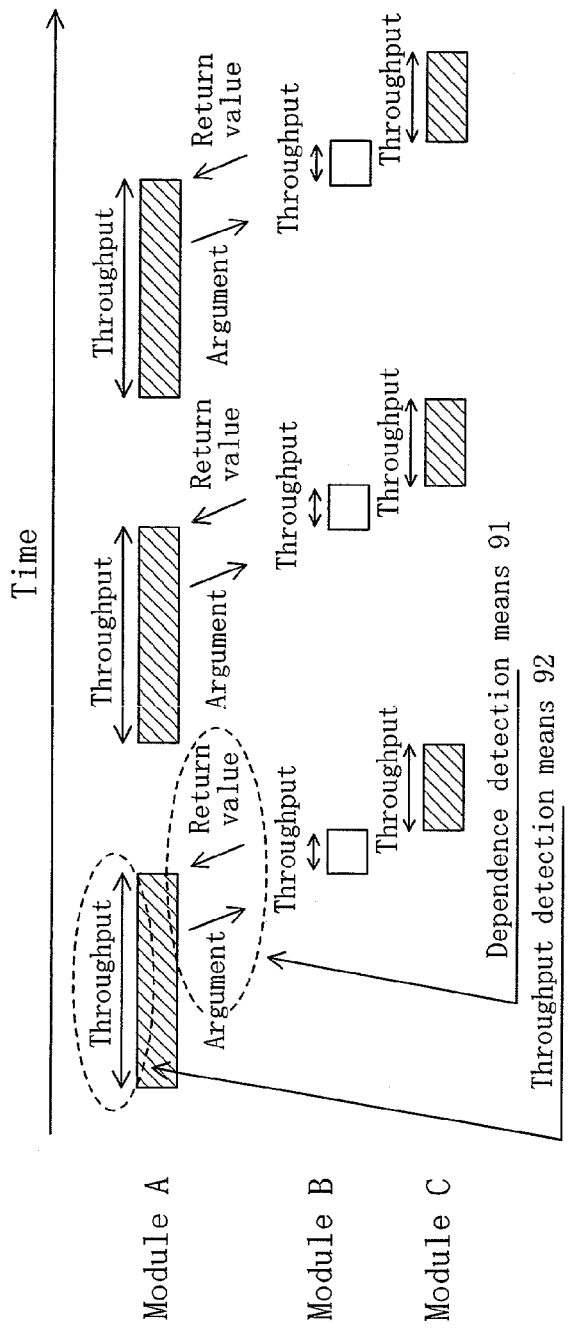
FIG. 12(a) is a view of examples of the detected dependence and throughput.

FIG. 12(a) is a view demonstrating the detection of the dependence and the throughput. Assume that the program to be processed includes three modules, module A, module B and module C, in which module A has a throughput greater than module B and module C, and module B has a dependence (argument, return value) with module A. The dependence detection means 91 detects the dependence between module A and module B, and the throughput detection means 92 detects the throughputs of module A, module B and module C.

The detected dependence information and throughput information are supplied to a program control decision means 93. The program control decision means 93 decides in which mode each module should be operated, the VLIW mode or the multithread mode, based on the supplied dependence information and throughput information, and performs operation mode control for the compiler 95 and an assembler 96.

Figure 12B:
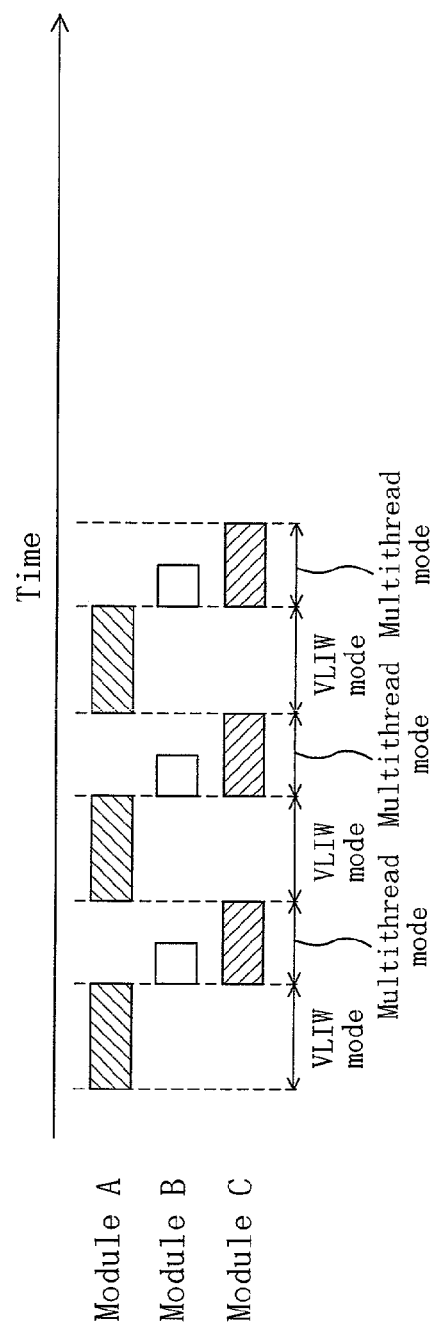
FIG. 12(b) is a view showing mode decision results.

FIG. 12(b) shows an example of decision results. Module A having a large throughput operates in the VLIW mode, and module C having no dependence operates in parallel with module B in the multithread mode. The compiler 95 compiles the module source code 90 under this operation mode control, inserting a mode change code to the VLIW mode or the multithread mode for each module unit, and supplies the assembler code data to the assembler 96. The assembler 96 also inserts or shifts a mode change code to the VLIW mode or the multithread mode for each module unit under the operation mode control by the program control decision means 93. In this embodiment, the insertion of a mode change code is done in both the compiler 95 and the assembler 96 for ensuring the optimization at a plurality of stages. As the operation mode change codes to be inserted, preferred are the "fork" instruction and the "join" instruction described in the first embodiment or codes capable of realizing similar operation.

FIG. 13 shows an example of a program output from the compiler 95. In the program of FIG. 13, the program control mode has already been decided for each module, and the "fork" instruction and the "join" instruction have been inserted as the operation mode change codes.

Thereafter, the program control decision means 93 supplies the operation mode information to an instruction memory allocation means 94. The instruction memory allocation means 94 allocates the VLIW region and the multithread region of the instruction memory address space to the modules, and performs address space control for a linker 97.

Figure 14:
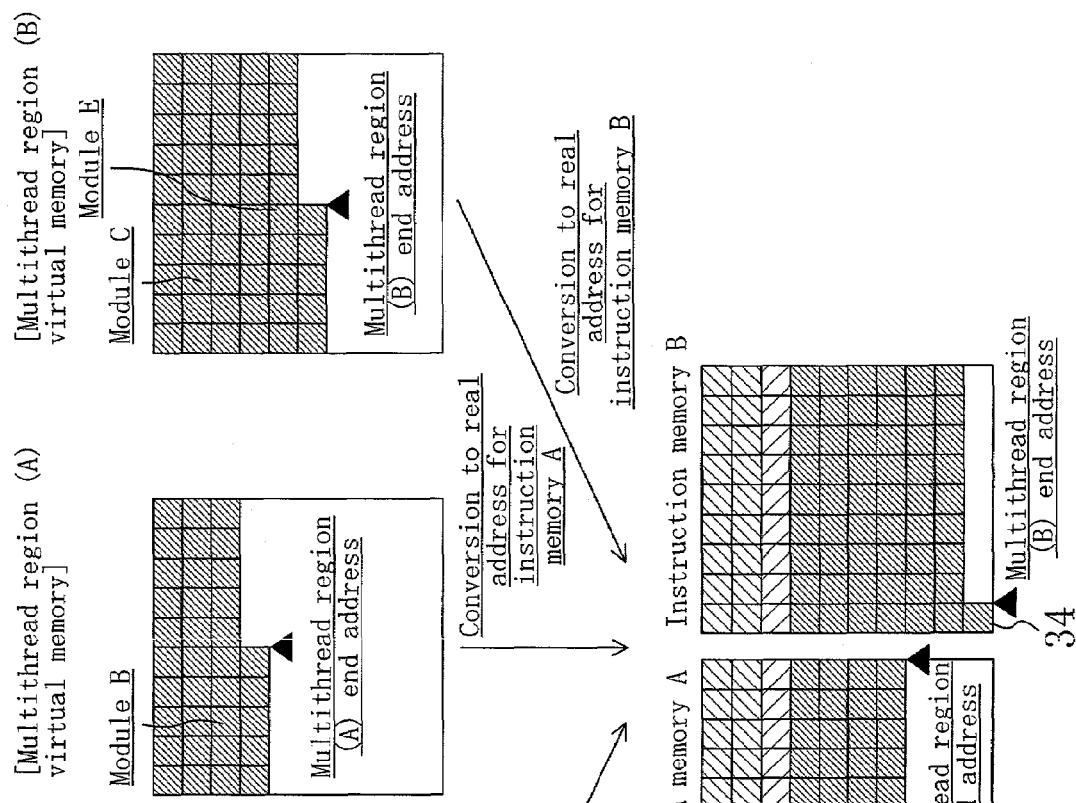
FIG. 14 conceptually illustrates allocation of instruction memories for the program shown in FIG. 13.

FIG. 14 conceptually shows allocation of the instruction memories for the program of FIG. 13. As shown in FIG. 14, first, the respective modules are placed in virtual memories. Modules A and D executed in the VLIW mode are placed in a VLIW region virtual memory, while modules B, C and E executed in the multithread mode are placed in relevant multithread region virtual memories. Thereafter, conversion to real addresses is performed. Specifically, address conversion for the VLIW region is performed over the instruction memories 33 and 34 regarding these memories as a single memory, while address conversion for the multithread regions is performed for the relevant instruction memories 33 and 34 separately.

The linker 97 performs mapping of instruction memory addresses for the instruction code data supplied from the assembler 96 for each module under the address space control by the instruction memory allocation means 94, and outputs the results as instruction codes 98. With this series of operation, the operation of each module can be optimized.

Figure 15:
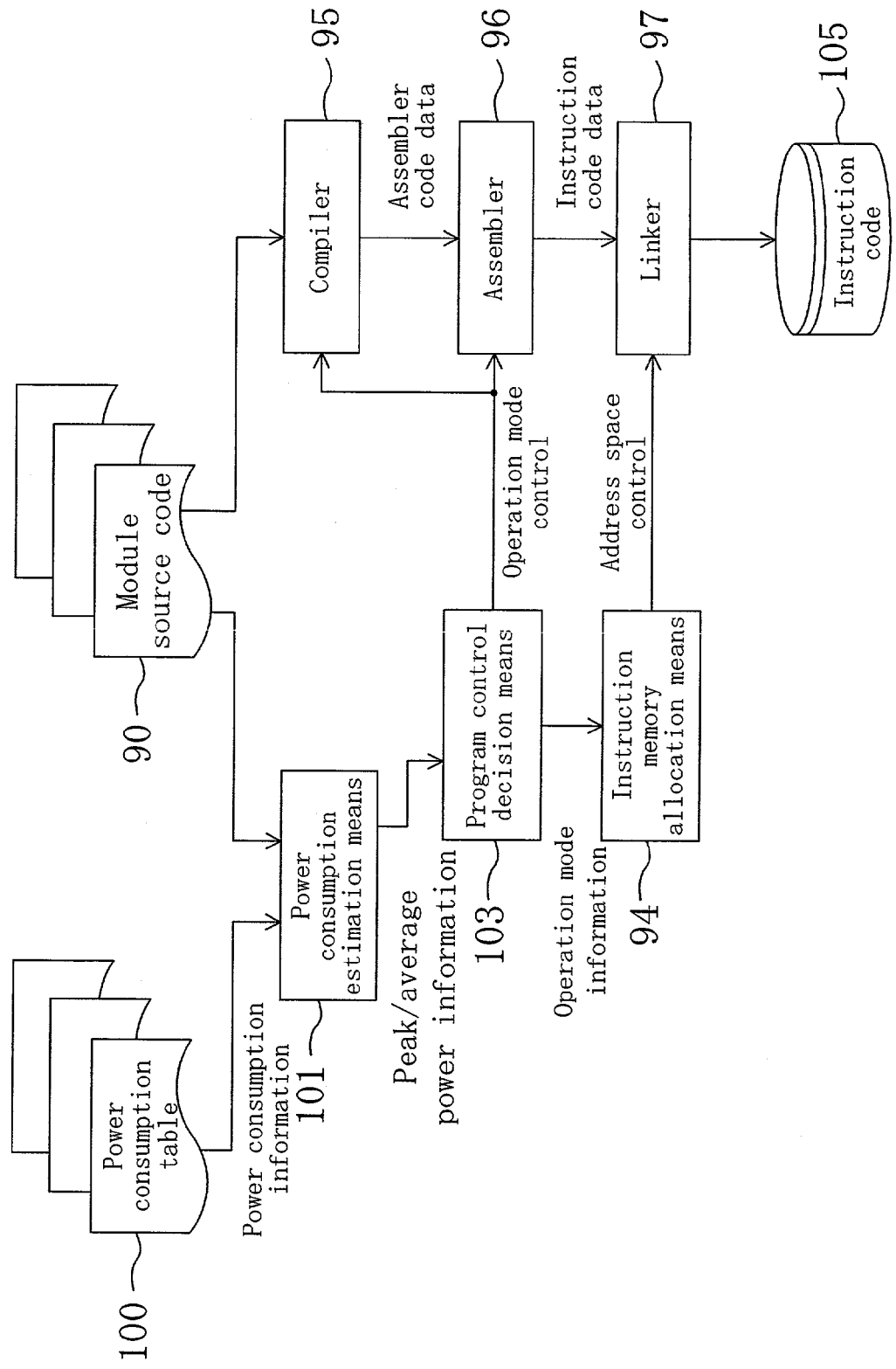
FIG. 15 is a block diagram of another program optimizing apparatus of the fourth embodiment of the present invention.
Figure 17A:
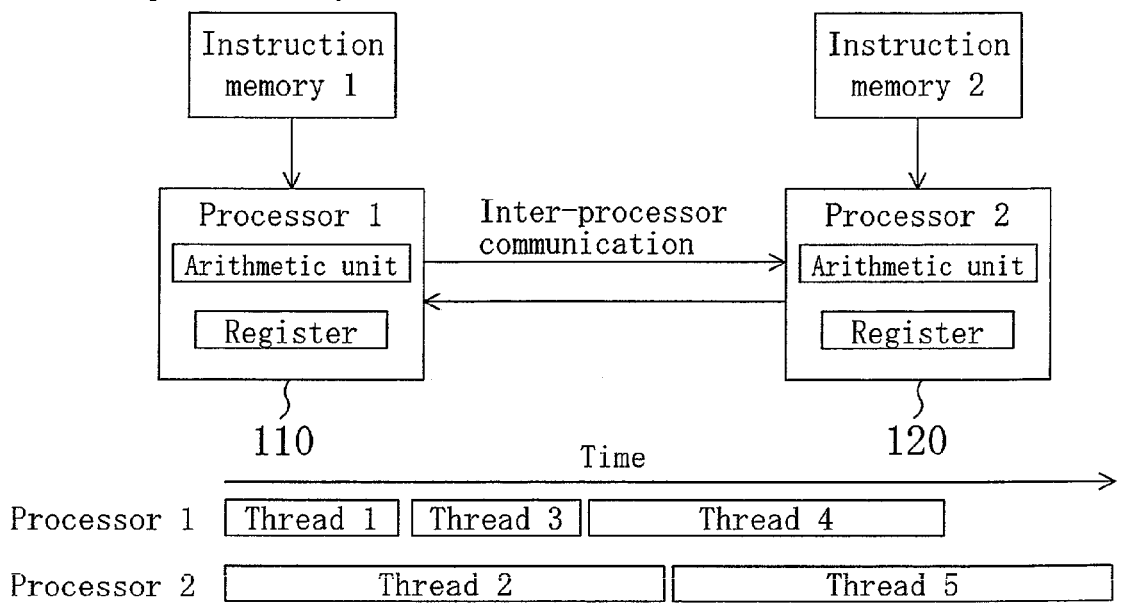
FIG. 17 shows configurations of conventional processor systems.
Figure 17B:
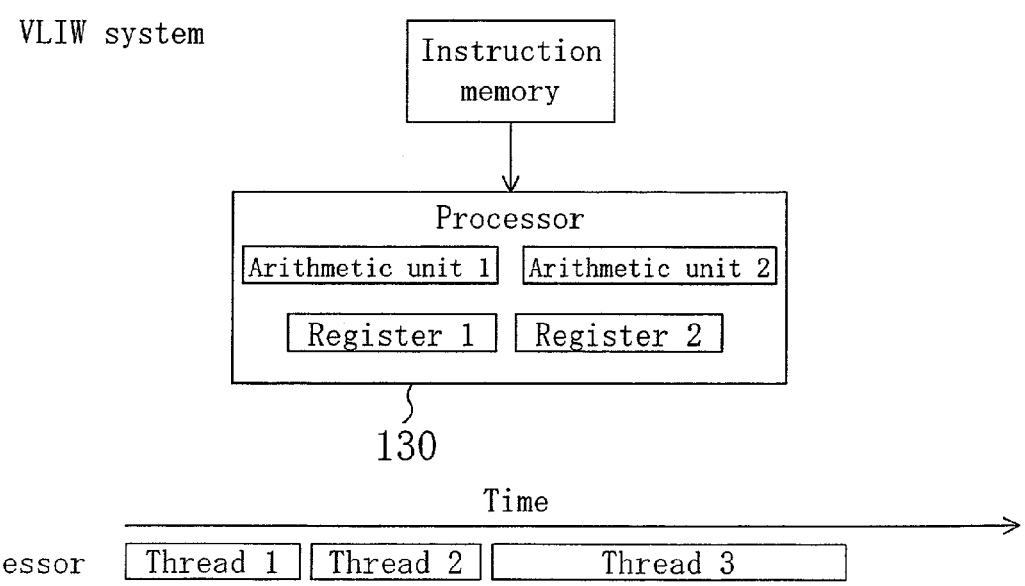

FIG. 15 is a conceptual block diagram of another program optimizing apparatus of this embodiment. In FIG. 15, like components as those in FIG. 11 are denoted by the same reference numerals, and description thereof is omitted here. The source code 90 of each module constituting an application is input into a power consumption estimation means 101 and a compiler 95. A power consumption table 100 includes power consumption for each instruction type for each processor of a multiprocessor system. The power consumption estimation means 101 analyzes the module source code 90 and also estimates the peak power and the average power consumed during execution of each module based on the power consumption information from the power consumption table 100.

FIG. 16(*a*) shows an example of the power consumption table, and FIG. 16(*b*) shows examples of estimation results of the power consumption for each module. As shown in FIG. 16(*a*), the processors of the multiprocessor system are different in power consumption because they are different in operator and register configuration. Also, the power consumption in the VLIW mode is different from that in the multithread mode.

A program control decision means 103 decides in which mode each module should be operated, the VLIW mode or the multithread mode, based on the peak power and average power information. In the example shown in FIG. 16(*b*), it is decided to execute module A in the VLIW mode and modules B and C in the multithread mode.

The subsequent operation is substantially the same as that of the apparatus of FIG. 11. Through the series of operation described above, the operation of each module can be optimized so that the optimum power consumption can be attained for the application in consideration of the power consumption characteristics different among the processors.

The program optimization described in this embodiment is effective for any type of multiprocessor system that includes a plurality of processors and has the first and second program control modes in which the processors are operated under a single program control and under a plurality of independent program controls, respectively.

Although the multiprocessor systems having two processors were exemplified in the embodiments described above for convenience of description, the number of processors may be more than two.

Although the VLIW mode and the multithread mode were used as examples of the first and second program control modes, other control modes may be used.

According to the present invention, in the multiprocessor system, the processor load can be dynamically optimized according to the processing details of the task. Therefore, both low power consumption and high-speed processing can be attained by minimizing the configuration of the operator and register resources and making effective use of these resources.

Also, according to the present invention, dynamic switching of the program control mode is attained. In addition, a plurality of operators of a plurality of processors may be combined to perform an operation in the first program control mode, and a plurality of processors may be synchronized in the second program control mode.

Moreover, according to the present invention, an optimum instruction code can be generated for a program executed in the multiprocessor system having the first and second program control modes. It is also possible to generate an instruction code in consideration of the power consumption characteristics different among the processors.

What is claimed is:

1. A multiprocessor system comprising:

a plurality of processors; and an instruction storage section for storing instructions in a program, wherein the system has a first program control mode for operating the plurality of processors under a single program control and a second program control mode for operating the plurality of processors under a plurality of independent program controls, each of the plurality of processors includes a program controller having a program synchronization flag, the program synchronization flag holding program synchronization information indicating either the first or second program control mode, and one of the plurality of processors serving as a master processor performs program control over the entire multiprocessor system and notifies the instruction storage section of updated program synchronization information when the program synchronization information is updated, and wherein the instruction storage section has instruction memories of the same number as that of the plurality of processors, when the program synchronization information from the master processor indicates the first program control mode, the instruction memories are operated as a single memory bank, and an instruction address output from the master processor is sent to the instruction memories and a single item of instruction data is output, and when the program synchronization information indicates the second program control mode, the instruction memories are operated as a plurality of individual memory banks, and instruction addresses output from the processors are sent to the corresponding instruction memories and a plurality of items of instruction data are output.

2. A multiprocessor system comprising:

a plurality of processors; and an instruction storage section for storing instructions in a program, wherein the system has a first program control mode for operating the plurality of processors under a single program control and a second program control mode for operating the plurality of processors under a plurality of independent program controls, each of the plurality of processors includes a program controller having a program synchronization flag, the program synchronization flag holding program synchronization information indicating either the first or second program control mode, and one of the plurality of processors serving as a master processor performs program control over the entire multiprocessor system and notifies the instruction storage section of updated program synchronization information when the program synchronization information is updated, said multiprocessor system further comprising an instruction supply section having an instruction queue for temporarily storing the instruction data output from the instruction storage section in the instruction queue and then supplying the instruction data to the plurality of processors, wherein the instruction supply section receives notification of the program synchronization information from the master processor, and when the program synchronization information indicates the first program control mode, the instruction queue is used as a queue for a single item of instruction data, while when the program synchronization information indicates the second program control mode, the instruction queue is used as a queue for a plurality of items of instruction data.

3. A multiprocessor system comprising:

a plurality of processors; and an instruction storage section for storing instructions in a program, wherein the system has a first program control mode for operating the plurality of processors under a single program control and a second program control mode for operating the plurality of processors under a plurality of independent program controls, each of the plurality of processors includes a program controller having a program synchronization flag, the program synchronization flag holding program synchronization information indicating either the first or second program control mode, and one of the plurality of processors serving as a master processor performs program control over the entire multiprocessor system and notifies the instruction storage section of updated program synchronization information when the program synchronization information is updated, and wherein the master processor updates the program synchronization information to indicate the second program control mode when the master processor receives a first branch instruction code having a plurality of items of address data, and each of the plurality of processors updates the program synchronization information to indicate the first program control mode when the processor receives a second branch instruction code having one item of address data, and notifies the other processors of the updated program synchronization information.

4. A multiprocessor system comprising a plurality of processors, wherein a first processor of the plurality of processors, comprises:

an instruction register for storing a first instruction code including operational codes; and an instruction trigger generator for sending the first instruction code including operational codes or a second instruction code including operational codes input into the first processor as a trigger signal to a second processor of the plurality of processors when the second instruction code including operational codes matches the first instruction code including operational codes, wherein the system has a VLIW mode for operating the plurality of processors under a single program control and a multithread mode for operating the plurality of processors under a plurality of independent program controls, and wherein the instruction trigger generator of the first processor and/or the second processor changes the VLIW mode to the multithread mode or changes the multithread mode to the VLIW mode when the instruction trigger generator of the first processor sends the first instruction code or the second instruction code.

* * * * *